United States Patent [19]
Green

[11] Patent Number: 4,919,442
[45] Date of Patent: Apr. 24, 1990

[54] LEVERAGE LIFTING CART

[76] Inventor: Thomas F. Green, R.R. #1, Box 66B, Council Bluffs, Iowa 51501

[21] Appl. No.: 240,715

[22] Filed: Sep. 6, 1988

Related U.S. Application Data

[63] Continuation-in-part of Ser. No. 872,026, Jun. 9, 1986, abandoned, which is a continuation-in-part of Ser. No. 650,632, Sep. 14, 1984, abandoned.

[51] Int. Cl.$^5$ .............................................. B62D 21/00
[52] U.S. Cl. .............................. 280/43.1; 280/47.21
[58] Field of Search .................... 414/495, 522, 474; 280/47.21, 47.2, 659, 43.1, 47.34, 43.17, 43.22, 414.1, 414.2; 296/20

[56] References Cited

U.S. PATENT DOCUMENTS

| | | | |
|---|---|---|---|
| 287,541 | 10/1883 | Huff | 414/498 X |
| 416,519 | 12/1889 | Troxell | 414/498 X |
| 820,274 | 5/1906 | Wattey | 280/47.2 X |
| 1,169,622 | 1/1916 | Dick | 280/47.2 X |
| 1,587,842 | 6/1926 | Knox | 280/47.2 X |
| 2,711,259 | 6/1955 | Jones | 280/414.1 X |
| 2,841,438 | 7/1958 | Weil | 414/498 X |
| 2,877,048 | 3/1959 | Weil | 296/20 |
| 3,403,923 | 10/1968 | Mouchet | 280/43.1 |
| 3,682,337 | 8/1972 | May et al. | 414/498 X |
| 3,741,586 | 6/1973 | Wiczer | 280/652 X |
| 3,768,677 | 10/1973 | Moss | 280/414.1 X |
| 3,830,522 | 8/1974 | Boucher | 280/414.1 X |
| 3,860,255 | 1/1975 | Rodriquez | 280/414.1 X |
| 3,873,118 | 3/1975 | Takagi | 280/47.2 |
| 3,980,334 | 9/1976 | Ferneau et al. | 296/20 |
| 4,009,891 | 3/1977 | Jensen | 280/47.2 X |
| 4,192,541 | 3/1980 | Ferneau | 296/20 |
| 4,212,580 | 7/1980 | Fluck | 414/522 |

Primary Examiner—David A. Bucci
Attorney, Agent, or Firm—George R. Nimmer

[57] ABSTRACT

Leverage lifting cart, utilizeable along two distinct and generally horizontal planes, has a longitudinal cargo receiving bed attached to a pair of laterally extending and preferably wheeled axles including a fixed-elevational rear-axle and a front-axle carried by a vertically controllably movable carriage extending pivotably and medially downwardly from the cargo bed. The vertical distance between the carriage supported front-axle and the cargo bed is remotely controllable by an operator nearby the cargo bed front-end. Specially contoured bridges connect the rear-axle to the front-axle. By virtue of this basic structure, and which can be desireably augmented with other novel structural features, the operator can leverage cargo loads between disparate planes and can safely, reliably, and conveniently maneuver the loaded cargo along the available expanse of one or more planes. The cargo bed is forwardly equippable with cargo anchoring and abutment parts so that the cargo itself can augment the structural strength of the leverage lifting cart.

12 Claims, 3 Drawing Sheets

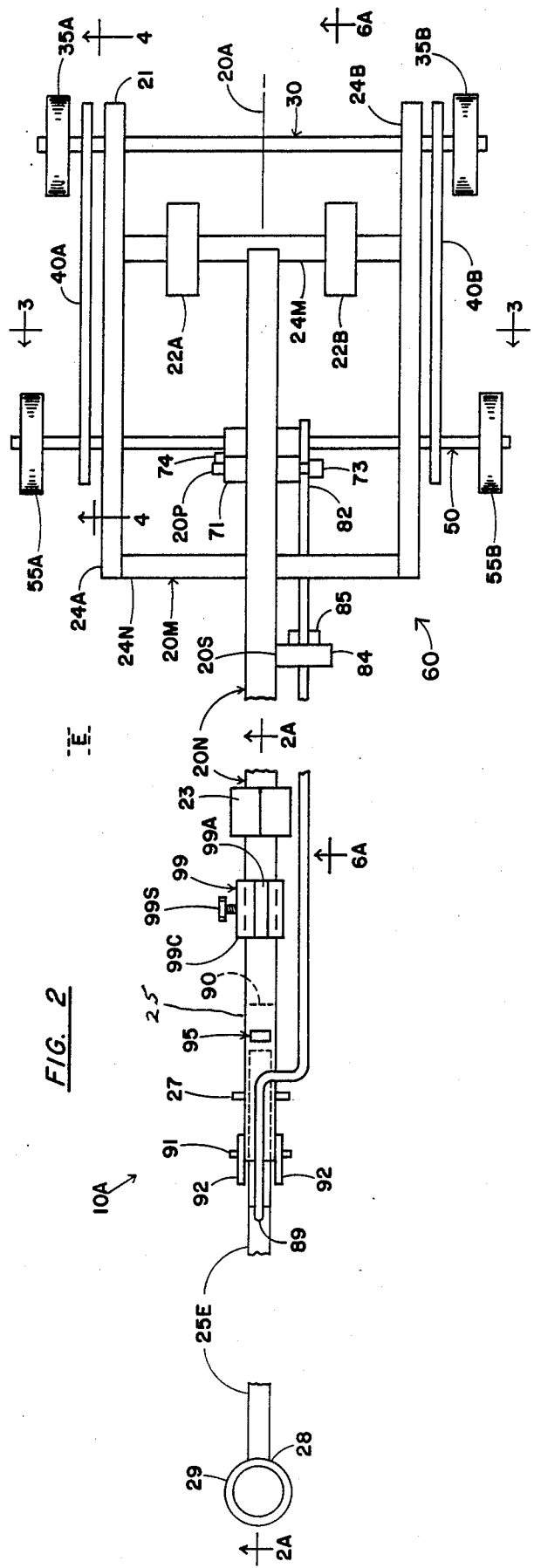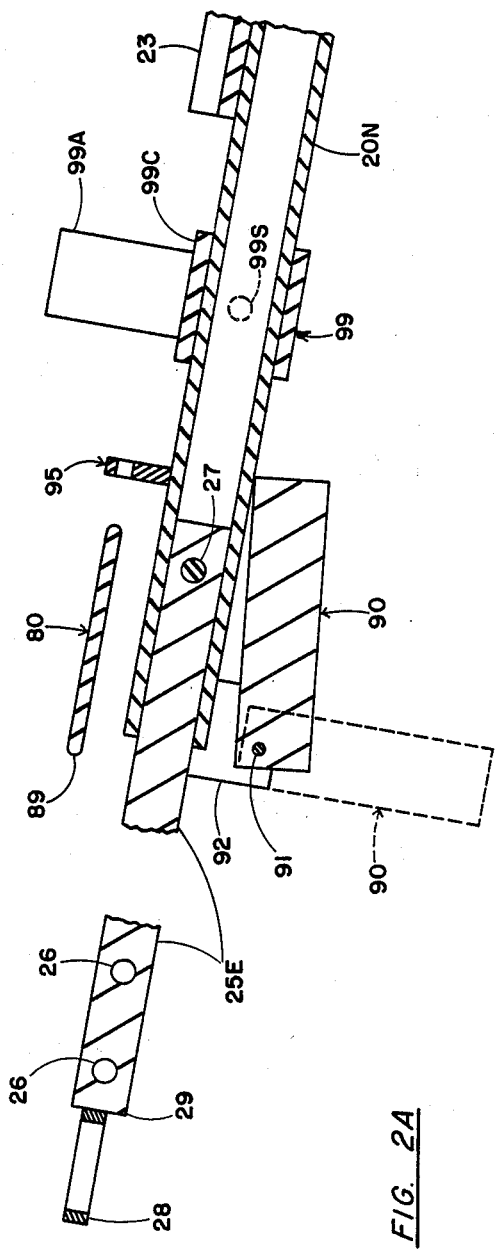
FIG. 2
FIG. 2A

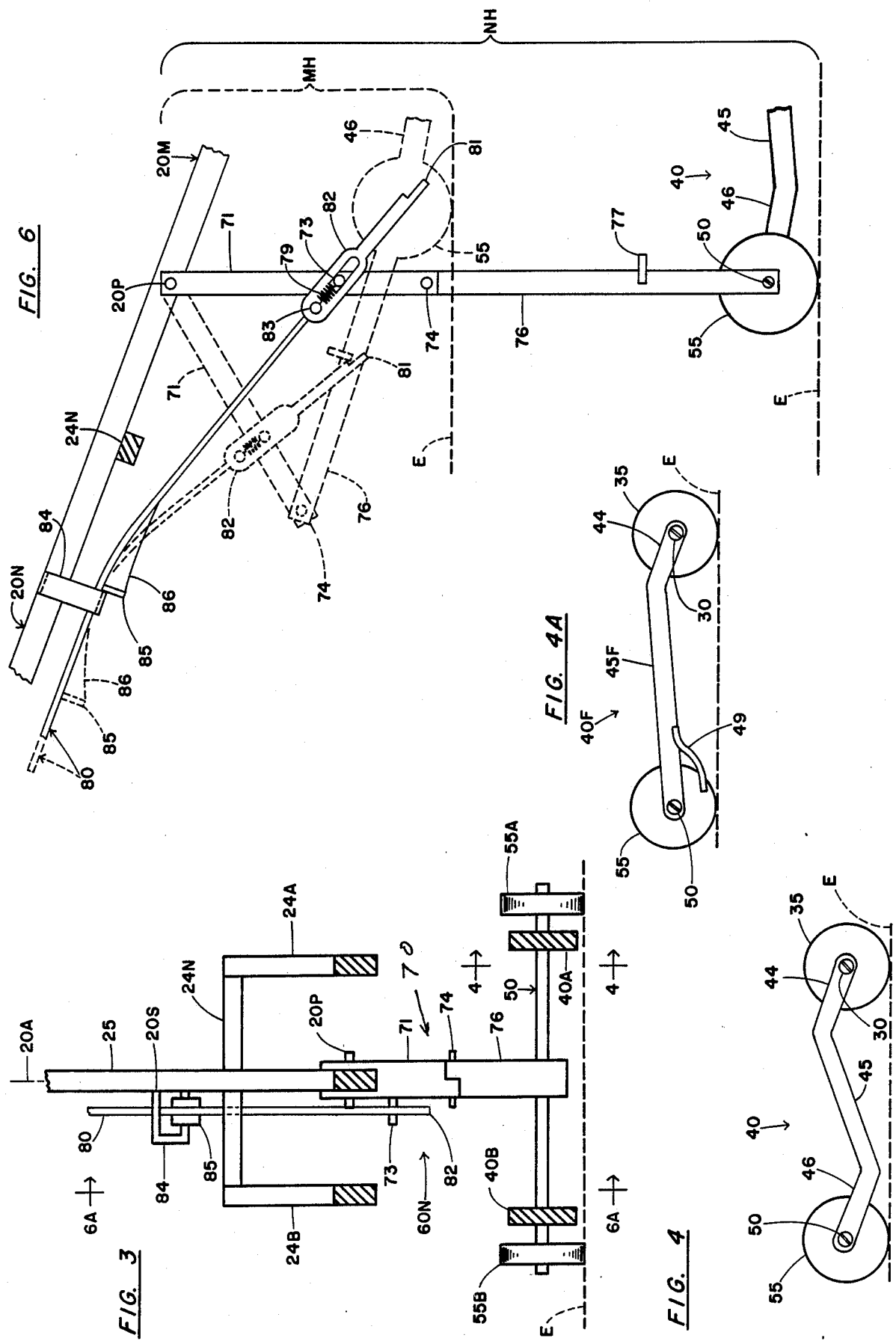

LEVERAGE LIFTING CART

RELATED APPLICATION

This application is a continuation-in-part of co-pending U.S.A. application Ser. No. 06/872,026 (filed June 9, 1986), now abandoned, which is a continuation-in-part of Ser. No. 06/650,632 (filed Sept. 14, 1984), now abandoned.

BACKGROUND OF THE INVENTION

Prior art workers have sought to provide leverage lifting carts that enable an operator to leverage heavy loads between two disparate planes and including the capability for safely, conveniently, and reliably maneuvering the load along the available spatial expanse of one or both disparate elevations. In this regard, there are, inter alia, the relevant teachings of U.S. Pat. Nos. 3,403,923 (Mouchet-10/1/1968); 3,741,586 (Wiczer-6/26/1973); and 3,980,334 (Ferneau-9/14/1976). Though the aforementioned prior art teachings relate to leverage lifting carts whose avowed purposes are to leverage heavy loads between disparate elevational planes and to maneuver the load along a spacially expansive plane, the prior art is fraught with structural limitations and deficiencies tending to frustrate practical limitation of the avowed purposes.

GENERAL OBJECTIVE OF THE INVENTION

It is accordingly the general objective of the present invention to provide leverage lifting carts directed to the goal of enabling the operator to leverage heavy loads between disparate elevations and to safely, conveniently, and reliably maneuver the load therealong, and which leverage lifting carts tend to overcome the several disadvantages and deficiencies associated with those of the prior art. Other general objectives include the provision of such leverage lifting carts having unusual versatility for safe and reliable operation, having accommodation to the convenient handling of numerous kinds of cargo loads, which can be safely fabricated of relatively light-weight structural materials and economically maintained, and which operational objectives in most situations can be readily accomplished by a lone operator.

GENERAL STATEMENT OF THE INVENTION

With the above general objectives in view, and together with ancillary and more specific objectives which will become readily apparent as this description proceeds, the leverage lifting cart concept of the present invention has several stable and metastable traversing modes including a stable procurement mode whereat a forwardly and upwardly inclined cargo bed is rearwardly provided with a fixed-elevation and laterally extending rear-axle and is medially and pivotably provided with an upright but downwardly collapsible carriage having a lateral front-axle, the cart substrate engagement wholly consisting of wheels or other substrate-engager, the vertically extending carriage collapsibility being manually controllable by an operator located at the cart frontal portion, at least one generally horizontal and contoured bridge member connecting the rear-axle to the front-axle, cargo bed frontal anchoring and abutment parts enabling the cargo to itself augment the structural strength of the leverage lifting cart, and together with other desirable optional features.

GENERAL DESCRIPTION OF THE DRAWING

In the drawing, wherein like characters refer to like parts in the several views, and in which:

FIG. 2 is a structurally detailed plan view of representative embodiment 10 and taken in the direction of line 2—2 of FIG. 1A;

FIG. 2A is a sectional elevational view taken along line 2A—2A of FIG. 2;

FIG. 3 is a sectional elevational view taken along line 3—3 of FIG. 2;

FIG. 4 is an elevational view taken along lines 4—4 of FIGS. 2 and 3 and showing a bridge member between rear-axle and front-axle;

FIG. 4A is an elevational view similar to FIG. 4 but directed to an alternate bridge member;

FIG. 5 is a schematic view similar to FIG. 1C, but showing an alternate-maneuvering mode capability made possible by a novel catch means optional feature; and FIG. 6 is a sectional elevational view taken along lines 6A—6A of FIGS. 2 and 3 and showing the catch means feature.

DESCRIPTION OF SCHEMATIC VIEWS

Figure 1:
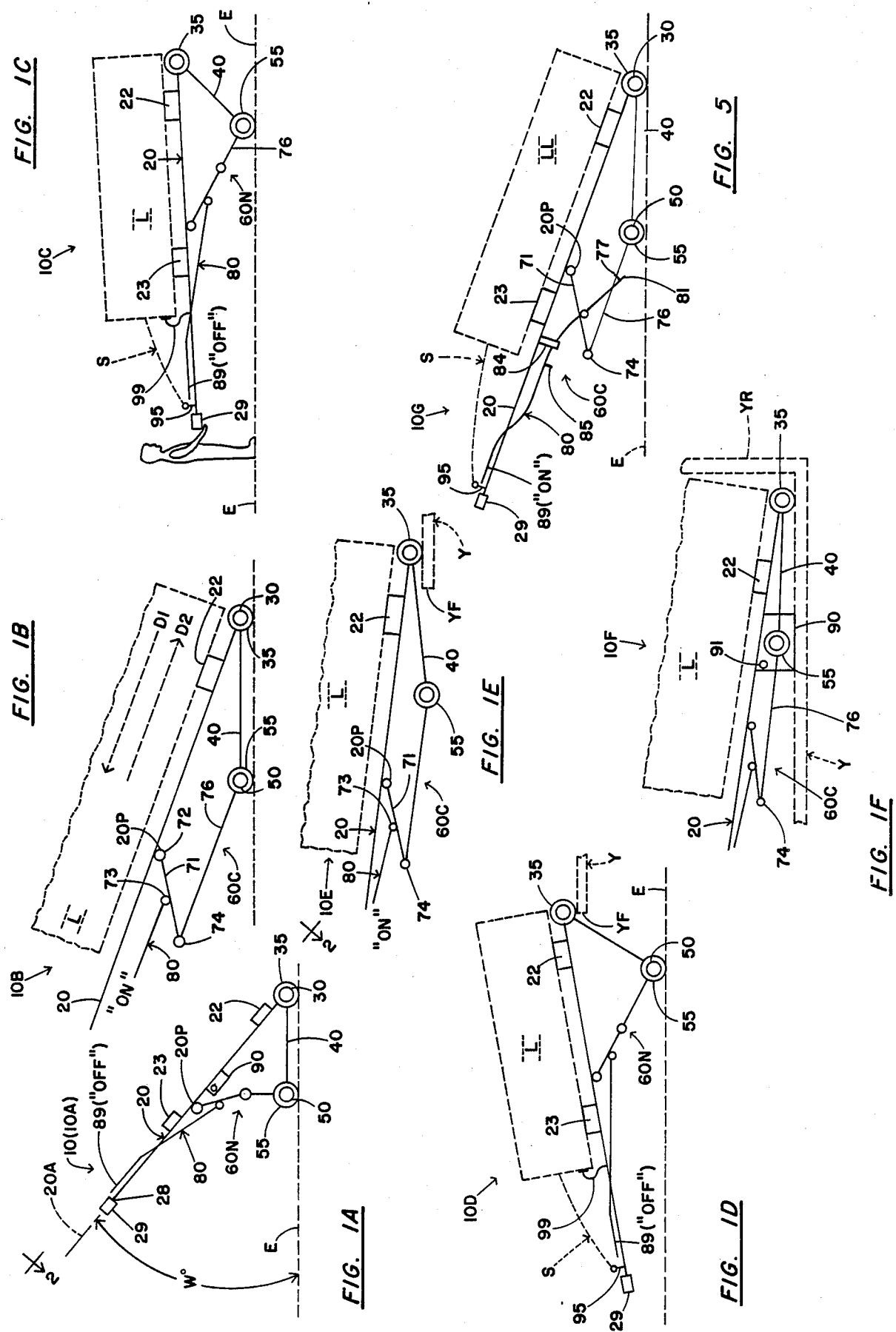
FIGS. 1A–1F are six schematic elevational views that indicate operational capabilities of a representative embodiment (10) of the leverage lifting cart concept of the present invention.

Though drawing FIGS. 2-2A, 3, 4–4A, and 6 represent detailed views of the leverage lifting cart representative embodiment 10, six schematic elevational views (FIGS. 1A–1F) will first serve to orient the reader toward a more ready understanding of the detail views.

FIG. 1A shows substrate-traversing cart 10 in procurement mode 10A e.g. rollably self-sustaining upon a horizontal substrate such as earth "E". At this stable condition, the cart's sole contact with the substrate can be through a pair of laterally extending axles provided with wheels or other substrate-engaging means. Herein, rear-axle 30 has laterally spaced wheels 35 and front-axle 50 has laterally spaced wheels 55. For such wheels 35 and 55, each is preferably constrained to rotate in a single plane. A cargo bed 20 journals rear-axle 30 and extends longitudinally lengthily therefrom along a forwardly upwardly inclined central-axis 20A having an angular value ($W^o$) from the substrate (E). Cargo bed 20 has an inclined and loadable upper-side (e.g. 21–23) and has a lofty front-end (e.g. 28–29). Forward portions of cargo bed 20 are provided with load anchoring and abutment elements 95 and 99, respectively.

The front-axle (50) is carried by a carriage means 60 that pivotably depends from a cargo bed primary-pivot station 20P. There are collapsing means for permitting the carriage means to gravitationally collapse to a collapsed condition 60C (e.g. FIGS. 1B, 1E, 1F). However, in FIG. 1A, the carriage means is in a non-collapsed condition 60N i.e. extending a vertical normal-height from the primary-pivot station 20P to front-axle 50. A representative of such collapsing means takes the form of a collapsible strut 70 including an upper-length 71 pivoted at 72 to station 20P and further including a lower-length 76 journalling front-axle 50 and pivotably attached at 74 to upper-length 71. The collapsing means is governed by an "On"/"Off" control means (e.g. elongate control-bar 80) and controllably actuatable adjacent bed front-end 28. 73 denotes the connection of control-bar 80 to unidirectionally pivotal strut upperlength 71. In FIGS. 1A, 1C, and 1D, control means 80 is "Off" whereby the carriage means is non-collapsed i.e. extends rigidly downwardly from bed station 20P to front-axle 50. However, in FIGS. 1B, 1E, and 1F, the control means is "On" whereby the carriage means is in collapsed condition 60C i.e. front-axle 50 is free to float toward and away from cargo bed 20. 40 denotes a fixed-length bridge member attached to rear-axle 30 and to front-axle 50.

In FIG. 1B, and by virtue of the "On" control means, cart 10 is in a loading mode 10B wherein the wheels 35 and floating wheels 55 are all contacting substrate "E". Accordingly, a heavy load "L" can be moved in phantom line direction D1 onto this lowered cargo bed upper-side (e.g. 22, 23).

FIG. 1C shows cart 10 in a maneuvering mode 10C wherein the rear-axle wheels 35 are elevated above substrate "E" and front-axle substrate-engagement (e.g. wheels 55) represent the sole contact with substrate "E". The front-axle wheels' elevation is effected by the operator's pushing downwardly upon the cargo bed front-end (e.g. at 28) while he is rollably horizontally maneuvering the loaded cart along substrate "E". The transition from the collapsed carriage loading mode 10B to the non-collapsed carriage maneuvering mode 10C does not necessarily require manipulation of control-bar 80 because, as will be explained later, the transitory operational lifting of cargo bed front-end 28 is sufficient to rigidify the carriage to non-collapsed condition 60N.

FIG. 1D shows cart 10 in an emplanting mode 10D identical to maneuvering mode 10C, but where the operator has maneuvered rear-wheels 35 onto a downwardly abutting relationship against the laterally extending frontal portion YF of a platform means Y located above substrate "E". Accordingly, downwardly abutting rear-wheels 35 are adapted to serve as a laterally extending rollable fulcrum for the loaded cargo bed whenever the operator lifts and pushes on the cargo bed frontal portion.

FIGS. 1C, 1D, and 5, also schematically represent novel anchoring means (e.g. 95) and longitudinally movable and arrestable abutment means (e.g. 99). The latter prevents the cart's load "L" from moving in the forward longitudinal direction. The former permits the leverageable cargo bed (20) to be reliably fabricated of light-weight structural materials inasmuch as a connector (e.g. rope S) from load "L" to the anchoring means 95 enables the load itself to augment the cargo bed structural strength.

FIG. 1E shows cart 10 in a platform traversing mode 10E wherein the said FIG. 1D frontally lifting operator has actuated control-bar 80 to "On" whereby the carriage is collapsed (60C) and the operator can furnish upward and rearward manual exertion to the cargo bed frontal portion. Such manual exertion causes the rear-wheels rollable fulcrum (35) to move rearwardly away from platform front-edge YF and toward the platform rear YR.

FIG. 1F shows cart 10 in a platform resting mode 10F wherein the cart's load "L" has reached its rearward extreme (YR) from platform front-edge YF. Transition from the collapsed carriage mode 10E to the similarly collapsed resting mode 10F requires no manipulation of control-bar 80, but only a steady rearward manual exertion upon the cargo bed frontal portion is required. Pivotal block 90, in its selected condition abuttably beneath cargo bed 20, provides platform stabilization wherein pivotable stub block 90 establishes a slight gap between platform Y and front-wheels 55 in FIG. 1F.

These schematic FIGS. 1A–1F have thus explained that cart embodiment 10, commencing from the FIG. 1A procurement mode 10A, might be employed to:

(i) as seen in FIG. 1B to take on a load "L";

(ii) as seen in FIG. 1C, to maneuver the non-collapsed and loaded cart toward a goal (e.g. to platform Y);

(iii) as seen in FIG. 1D, to emplant the non-collapsed loaded cart rear-wheels 35 as a rollable fulcrum downwardly against the accessible region (YF) of a lofty platform;

(iv) as seen in FIG. 1E, to push the loaded collapsed cart rearwardly along the platform Y; and (v) whereby, as seen in FIG. 1F, the loaded cart in stable mode 10F is stably resting upon platform Y. The aforedescribed steps (i) to (v) might be followed in reverse order to return a load from mode 10F to mode 10B, whereby load "L" might be re-deposited (D2) to substrate "E". Moreover, the aforementioned steps might be followed in appropriate order to re-deposit load "L" to other types of substrates, or to attain a resting mode 10F at other selectable substrates or platforms.

DESCRIPTION OF DETAILED VIEWS

The above schematically described embodiment 10 will now be described in further structural detail with primary reference to FIGS. 2, 2A, 3, 4, 4A, and 6, and having primary orientation to the FIG. 1A procurement mode 10A.

Cargo bed 20 for embodiment 10 comprises a loadable rear-ward region 20M commencing at rear-end 21 and a lengthier forward region 20N commencing at front-end 28. Rearward region 20M is of generally rectangular plan shape comprising longitudinally extending members 24A (left) and 24B (right) flanking central-axis 20A plus laterally extending members 24M and 24N. Horizontal members 24M and 24N establish a parallel relationship between members 24A and 24B. Laterally extending horizontal rear-axle 30 is revolvably journalled by the rearward extremities of members 24A and 24B. The cargo bed upper-side 22 might take the form of pads 22A (left) and 22B (right) attached to and extending upwardly from rearward lateral structural member 24M. The cargo bed forward region 20N, which because of its lever function is lengthier than rearward region 20M, extends along central-axis 20A as central member 25. The longitudinal central member is rigidly attached at least to lateral structural member 24N. However, for added structural strength and to possibly serve as a situs for primary-pivot station 20P, central member 25 is additionally rigidly attached to structural member 24M. Cargo bed upper-side 22 might further include additional pad 23 attached to and extending upwardly from central member 25. Pad 23 is rearwardly remote from front-end 28 but not remote from rearward region 20M. 29 indicates an annular hitch member attached at cargo bed front-end 28.

The longitudinal length for leverage forward region 20N might be increased by providing a slidably telescopically associated and arrestable frontal-length 25E for central member 25. The hitch means (e.g. 29) would, of course, be terminally attached to frontal-length 25E. Frontal-length 25E is longitudinally arrestable herein by virtue of a laterally extending pin 27 insertable through laterally extending apertures in the frontal-length (e.g. at 26) and in the central member.

The previously mentioned anchoring means preferably extends upwardly from the cargo bed forward portion, such as an eye-bolt 95 erectably attached (as by welding) to central member 25. The previously mentioned abutment means (99) herein comprises a collar 99C slidably surrounding central member 25 and that is arrestable therealong (e.g. with setscrew 99S). Extending rigidly upwardly from collar 99C is shoulder 99A for abutting against a forward portion of a cargo load "L". And, as previously mentioned, pivotal stub block 90 is in vertical alignment with and located below central member 25. Specifically herein, central member 25 is provided with depending ears 92 that flank stub block 90, and a laterally extending pin 91 pivotably secures stub block 90 to ears 92.

Establishing the cargo bed inclination for the cart procurement mode (10A) and permitting same to traverse along a substrate "E" is a carriage means 60 that generally comprises:

(a) controllably collapsible upright strut means that is pivotally attached at a strut upper-length 71 to said primary-pivot station 20P and that is pivotally attached (74) to a strut lowerlength 76 that journals a laterally extending front-axle 50;

(b) said rear-axle and front-axle being respectively provided with substrate-engaging means (e.g. wheels 35 and 55); and (c) located immediately above and extending non-linearly along said substrate "E", laterally separated and fixed-length bridge members (e.g. 40, 40F) respectively attached to the said axles (30, 50). Notwithstanding the presence of these pivotal connections 20P, 74, and 50, a carriage non-collapsed condition (60N) is establishable by virtue of the oppositely laterally offset and abuttable ends of strut lengths 71 and 76. However, when a said control means (e.g. 80) is later moved from "off" to "on", the carriage assumes a said collapsed condition (60C). In the latter vein, strut upper-length 71 is medially provided with a laterally extending strut-pin 73. Though to be explained later in more detail, it now suffices to mention that a directionally forward force controllably applied to strut upperlength 71 (e.g. 80 at 73) will disrupt the abutment attainable only by the vertical strut lenghts (71, 76) and thereby permitting the erstwhile non-collapsed carriage means to gravitationally collapse to condition 60C.

The embodiment 10 control means, which permits a forwardly stationed to operated from "off" condition to "on" condition and thereby permit the carriage to assume a collapsed condition 60C, comprises an elongate control-bar 80 extending generally alongside the cargo bed forward region 20N. Control-bar 80 includes a lower rearward and longitudinally slotted portion 82 that loosely pivotably surrounding strut-pin 73. Forwardly of control-bar rearward portion 82, the control-bar is loosely surrounded by an annulus (e.g. U-shaped bracket 84) which is attached at a laterally offset relationtionship to a cargo bed secondary-station 20S located forwardly upwardly from primary-pivot station 20P. Control-bar 80 is provided with a depending detent 85, and a rearwardly extending tapered gusset 86 converges from the detent lower end to control-bar 80. Bracket 84 has a vertically oval bore. The control-bar forward-terminus (89) has an elevation at least equal to the cargo bed thereat. Herein, the control-bar at 89 is positioned immediately above central member 25. Accordingly, it can be seen that when the control means (80) is "off", control-bar detent 85 is below bracket 84 and abuts the rearward side thereof. However, when the control means is manually actuated to "on" i.e. by lifting and forwardly moving control-bar terminus 89, the gravitionally heavy cargo bed unidirectionally pivots strut upper-length 71. When this happens, the co-movably attached (e.g. at 73) and forwardly moving control-bar 80 at its detent 85 and gusset 86 pass through bracket 84 to a position somewhat forwardly thereof. Tapered gusset 86 facilitates the rearward directional passage of detent 85 through the bracket 84 when the operator lifts the cargo bed front-end 28 of a collapsed cart mode. In this regard, and as previously mentioned, such frontal lifting automatically re-establishes: the carriage means to a non-collapsed rigidified condition 60N; and the control means to "off" condition.

Turning now to FIG. 4 which depicts bridge member embodiment 40, and having the desireable capabilities for ensuring that a parallel pair (40A, 40B):

(I) in the FIG. 1D emplanting mode, such bridge members (e.g. at 44) ensure that the initial emplantation of rear wheels 35 is safely rearwardly of platform terminus YF, and (II) at the immediate continuation of the FIG. 1E platform traversing mode, such bridger members (e.g. at 46) prevent front wheels 55 from being trapped below platform terminis YF. Specifically, bridge member embodiment 40 provides a non-linear overall connection between axles 30 and 50 in a tripartite length including:

(i) a substantially linearly extending, predominate-length 45, (ii) a relatively short rear-length 44 that journals rear-axle 30 and that extends upwardly and forwardly therefrom to 45, and (iii) a relatively short front-length 46 that journals front-axle 50 and that extends downwardly and rearwardly therefrom to 45. Alternate embodiment (40F) for the bridge member is analagously depicted in FIG. 4A and which embodiment 40F has the desireable capabilities (i.e. (I), (II)) of embodiment 40. However, embodiment 40F differs from embodiment 40 in that: the forward extremity of linear predominate-length 45F journals front-axle 50; and, contoured bar 49 is attached to predominate-length 45F and extends non-linearly forwardly and downwardly therefrom.

At this juncture, there is introduced a seventh schematic drawing, FIG. 5, and akin to the FIG. 1C maneuvering mode 10C. However, with the FIG. 5 alternate-maneuvering mode 10G, the cart is rollably maneuverable along a substrate (e.g. "E") whereupon the rear-wheels 35 only are in rollable contact with the substrate and with the front-wheels 55 being elevateable thereabove. For such alternate-maneuvering mode 10G, the front-axle carriage means is not in the embodiment 10C rigidified non-collapsed condition 60N, but rather is in the collapsed condition (60C) suggested by FIGS. 1B, 1E, and 1F. And in the latter regard, to attain the above-substrate elevation for the embodiment 10G front-wheels 55, embodiment 10G is augmented with a catch means (e.g. 77, 81) which releasably maintains the carriage means fully collapsed condition. Accordingly, such releasable catch means (e.g. 77, 81) effects the alternate-maneuvering mode 10G whereupon heavier loads "LL" can be safely maneuvered at a center-of-gravity lower than for the other maneuvering mode 10C.

The final drawing, FIG. 6, at solid lines relate to structure shown in FIGS. 2-3 (i.e. taken along lines 6A—6A thereof), though augmented by the optional releasable catch means (e.g. 77, 81) for optional mode 10G. In FIG. 6A, wherein the control means (e.g. control-bar 80) is at off-condition and the carriage means is rigidly non-collapsed (60N), the control-bar detent 85 is below annulus 84 and abuts the rearward side thereof. Moreover, the control bar slotted rearward-portion 82, which loosely surrounds strut-pin 73, is frontally provided with a lateral-pin 83; a helical spring 79 attaches strut-pin 73 to lateral-pin 83. In such solid lines non-collapsed condition, the normal-height between pivotal primary-station 20P and front-axle 50 is indicated as "NH". As previously alluded to in connection with FIGS. 2–3, and as indicated in FIG. 6A phantom lines, when control-bar 80 is manually actuated to on-condition, the gravitationally heavy cargo bed causes the front-axle carriage means to collapse. During such upward and forward actuation of control-bar 80 from 89, the spring 79 is briefly stretched and the gusseted (86) detent 85 passes forwardly through annulus 84. This carriage collapsibility is indicated in FIG. 6A phantom line conditions for the pivotally attached upper-strut (71) and lower-strut (76) and for the wheeled (55) front-axle.

In FIG. 6, "MH" indicates that the carriage means is ultimately collapsible to a minimum-height bearing a ratio of less than one-fourth as compared to said non-collapsed normal-height "NH". As will be recalled from FIG. 5C, there are catch means for automatically (though releasably) maintaining the carriage means fully collapsed minimum-height "MH" to permit utilization of the FIG. 5C alternate-maneuvering mode 10G. The catch means releasement is desireably remotely controllable by an operator positioned adjacent the cargo bed front-end. Toward the goal of such automatically engageable and forwardly remotely releasable catch means, control-bar 80, rearwardly of its slotted portion 82, is provided with a narrowed and notched rear-end 81. Moreover, a laterally offset and upright dog 77 is attached to lower-strut 76. Accordingly, as indicated in FIG. 6 phantom line, when the gravitationally collapsing carriage means has attained its minimum-height "MH", the catch means upright dog 77 cams upwardly against the control-bar rear-end 81 to briefly re-stretch spring 79 until dog 77 is above control-bar rear-end 81 and whereupon spring 79 then rearwardly moves rear-end 81 beneath dog 77 to automatically maintain minimum-height "MH". Releasement of such catch means and attainment of maneuvering mode 10C are simultaneously effected by lifting control-bar forward terminus 89 and cargo bed front-end 28 whereupon spring 79 momentarily re-stretches and the gusseted detent 85 reassumes a rearward abutment against annulus 84.

It might be recalled parenthetically that so-called "class-1" and "class-2" leverages are appropriately operationally employed. For example, in the FIG. 1C maneuvering mode, wherein the operator must maintain a downward pressure upon the lever-bar (e.g. at 28), "class-1" leverage is employed. But in the FIG. 1E platform traversing mode and in the FIG. 5C alternate-maneuvering mode, wherein the operator must maintain an upward pressure upon the lever-bar (e.g. at 28), "class-2" leverage is utilized.

From the foregoing, the construction and operation of the leverage lifting carts will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

What is claimed is as follows:

1. Leverage lifting cart having a procurement mode traversible along a substantially horizontal substrate and at said procurement mode comprises:
   (A) a cargo bed extending lengthily longitudinally along a central-axis that is inclined forwardly and upwardly from a said substrate whereby said cargo bed has: a rear-end nearer to said substrate; a front-end overlying said substrate; and an inclined loadable upper-side having a lengthier forward region and also a shorter rearward region for receiving and discharging an arbitrarily selectable load;
   (B) said cargo bed at the rear-end being provided with a directionally laterally extending rear-axle;
   (C) said cargo bed nearer to the rear-end than to the front-end thereof being provided with a primary-pivot station, the majority of said upper-side rearward region being located rearwardly of said primary-pivot station;
   (D) said cargo bed forwardly of said primary-pivot station being provided with anchoring means that permits a cargo load to be attached to the cargo bed forward region;
   (E) said cargo bed between said primary-pivot station and said anchoring means being provided with a longitudinally movable and arrestable abutment means for abutting a forward portion of a said arbitrarily selectable load;
   (F) a carriage means establishing a cargo bed inclination of the procurement mode and permitting it to traverse along a said substrate, said carriage means comprising:
      (Fi) a controllably collapsible upright strut means including a strut upper-length that is pivotably attached to said primary-pivot station and that is pivotably attached to a strut lower-length having a directionally laterally extending front-axle,
      (Fii) said rear-axle and front-axle being respectively provided with substrate-engaging means, and
      (Fiii) located immediately above and extending along said substrate, laterally separated, non-linear and fixed-length bridge members respectively attached to said rear-axle and to said front-axle so that when said cargo bed is parallel to said substrate, said bridge members lie at an acute angle relative to said substrate; and
   (G) control means actuatably extending forwardly upwardly from said collapsible strut means and also alongside the cargo bed, said control means having a forward terminus manually controllably movable from an off-station to an on-station that permits strut means collapsibility, and said forward terminus being manually accessible to an operator located forwardly remote of said cargo bed primary-pivot station.

2. The leverage lifting cart of claim 1 wherein, for the carriage means upright strut means, the strut upper-length is maintained non-pivotal with the primary-pivot station when the control means is at said off-station; and wherein the control means comprises an elongate inclined control-bar having said forward terminus and also having a lower rearward-portion pivotably attached to a laterally extending strut-pin on said strut upper-length, said control means further comprising a control-bar medial-station surrounded by a vertically elongated U-shaped bracket attached to the cargo bed and located forwardly upwardly from said cargo bed primary-pivot station, and said control bar being provided with a downwardly extending detent normally abuttable against a lower portion of said U-shaped bracket and thereby establishing the control means off-station, whereby manual pressure exerted upwardly against the control-bar forward terminus causes the detent to be lifted away from said bracket lower portion and establishes the on-station and thereby permits the strut means to gravitationally collapse.

3. The leverage lifting cart of claim 1 wherein the substrate-engaging means comprises laterally separated and uniplanarly rotatable wheels for the rear-axle and also for the front-axle; wherein the anchoring means extends upwardly from the cargo bed forward region.

4. The leverage lifting cart of claim 1 wherein there is a dual-purpose stub block pivotably attached to the cargo bed forward region and portions of said stub block being pivotably abuttable against said cargo bed.

5. The leverage lifting cart of claim 4 wherein carriage means is ultimately collapsible to a minimum finite-height and whereat said stub block maintains the front-axle substrate-engaging means a small spatial gap above an underlying substrate.

6. The leverage lifting cart of claim 5 wherein at said carriage minimum-height mode, a manually releasable catch means maintains the carriage minimum-height.

7. The leverage lifting cart of claim 2 wherein the control-bar loosely pivotably surrounds said strut-pin; wherein said control-bar, forwardly of the strut-pin, is provided with a lateral-pin; and wherein a helical spring is attached to said lateral-pin and to said strut-pin.

8. The leverage lifting cart of claim 7 wherein the carriage means is ultimately collapsible to a finite minimum-height; and wherein there is a manually releasable catch means for maintaining the said carriage minimum-height, and said catch means release being remotely controllable by an operator positioned forwardly remote of the primary-pivot station.

9. The leverage lifting cart of claim 7 wherein said catch means comprises the combination of:
 (i) an upright dog laterally offset from and attached to the strut lower-length; and
 (ii) said control-bar extending rearwardly from said strut-pin surrounding rearward portion to terminate as a narrowed rear-end;

whereby as the said carriage means attains minimum-height, the catch means upright dog cams upwardly against the control-bar rearward-end to forwardly compress said spring until the dog is above the control-bar and whereupon said helical spring rearwardly moves the control-bar rearward-end beneath said dog to effect said catch means.

10. The leverage lifting cart of claim 1 wherein each bridge member includes a rear-length attached to and extending forwardly and upwardly from the rear-axle.

11. The leverage lifting cart of claim 10 wherein each bridge member is of a tripartite length and includes:
 (i) a linearly extending and lengthwise predominate central-length,
 (ii) a front-length attached to and extending rearwardly and downwardly from the front-axle.

12. The leverage lifting cart of claim 10 wherein each bridge member has a contoured-bar extending non-linearly and forwardly downwardly therefrom.

* * * * *